United States Patent [19]
Uemura et al.

[11] 3,947,813
[45] Mar. 30, 1976

[54] MASTER CYLINDER LIQUID LEVEL ALARM

[75] Inventors: Hiroshi Uemura; Kaoru Tsubouchi, both of Toyota, Japan

[73] Assignee: Aisin Seiki Kabushiki Kaisha, Kariya, Japan

[22] Filed: June 27, 1974

[21] Appl. No.: 483,775

[30] Foreign Application Priority Data
July 3, 1973 Japan................................ 48-79601

[52] U.S. Cl............... 340/59; 340/244 E; 200/84 C
[51] Int. Cl.²............................................. G08B 21/00
[58] Field of Search.... 340/52 B, 59, 244 R, 244 A, 340/244 E; 200/84 R, 84 C

[56] References Cited
UNITED STATES PATENTS
3,603,925 9/1971 Hughes................................ 340/59
3,603,926 9/1971 Kimura................................ 340/59
3,680,044 7/1972 Tsubouchi............................ 340/59

*Primary Examiner*—Alvin H. Waring
*Attorney, Agent, or Firm*—Holman & Stern

[57] ABSTRACT

A liquid level reduction alarm device for a braking liquid reservoir vessel in communication with a brake master cylinder wherein the reservoir is closed at its upper open end by an elastic cover member and an elongated hollow case member is suspended from the cover member into the interior space of the reservoir a magnetically operated reed switch is mounted within the interior of the case member and connected with an alarm circuit including an alarm lamp.

5 Claims, 1 Drawing Figure

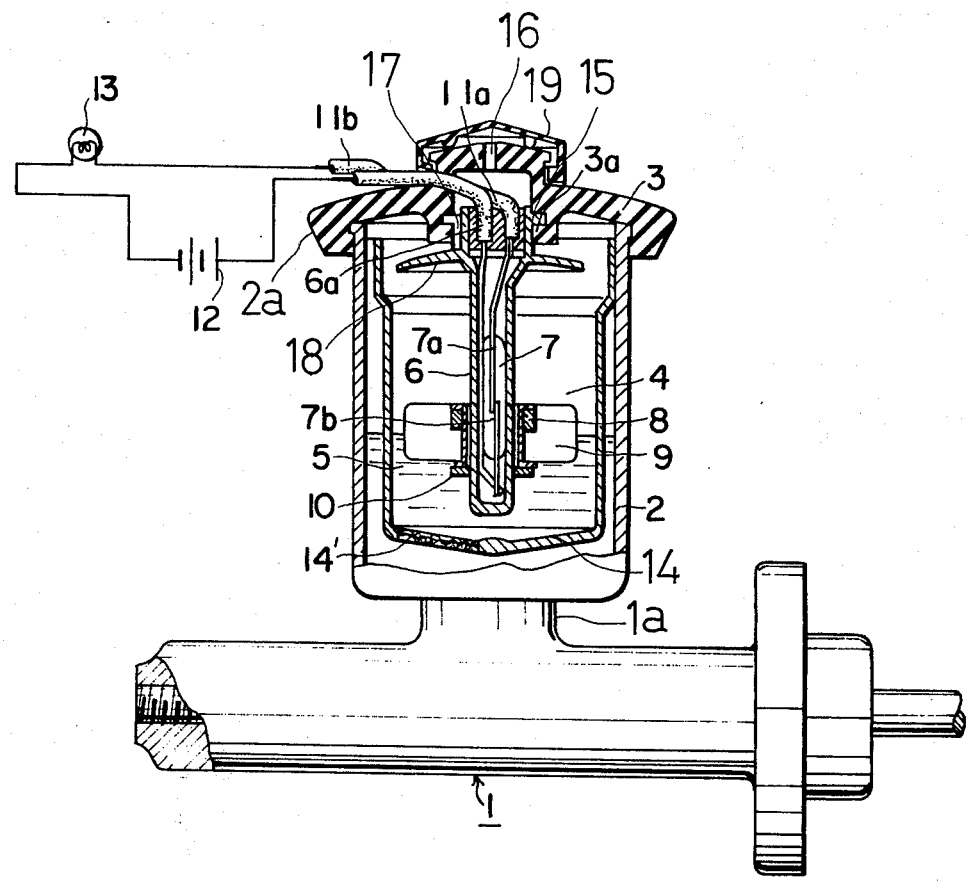

MASTER CYLINDER LIQUID LEVEL ALARM

BACKGROUND AND SUMMARY OF THE INVENTION

This invention relates to a liquid level reduction alarm device for a liquid reservoir vessel kept in liquid communication with a braking master cylinder, preferably in automotive use and adapted for delivery of alarm signal to the vehicle driver, if the liquid level in the reservoir vessel should reduce to an excessive degree, so as to warn him to replenish the brake oil.

It is a main object of the present invention to provide a substantially shock-proof electric and built-in alarm system highly effective in the aforementioned field of engineering.

A further object is to provide an effective alarm system of the above kind which is operable magnetically and automatically responsive to the liquid level contained in the reservoir vessel.

A still further object is to provide an alarm system of the above kind which is highly effective to avoid misoperation caused by outside vehicle shocks.

These and further objects, features and advantages of the present invention will become more apparent from the following detailed description of the invention by reference to the accompanying drawing illustrative of a preferred embodiment of the present invention.

BRIEF DESCRIPTION OF THE DRAWING

The single DRAWING is a partially sectioned elevational view of a preferred embodiment of the invention.

DESCRIPTION OF THE PREFERRED EMBODIMENTS

In the following, a preferred embodiment of the invention will be described in detail by reference to the accompanying drawing.

Numeral 1 represents an automotive master cylinder having a rigid branch neck 1a through which the interior space of the master cylinder is kept in fluid communication with interior space 4 of a liquid reservoir 2 rigidly connected with the branch neck. The open upper end of reservoir 2 is closed by a cap member 3 which is made preferably of a plastic material as shown. The space 4 is partially filled with a braking liquid, preferably oil as shown at 5.

The cap member 3 is attached fixedly, yet detachably at the flanged top end 2a of the reservoir vessel 2 in the form of a tongue-and-groove connection. The cap member is provided at its center portion with a hollow cylindrical depending projection 3a to which a depending elongated case member 6 is fixedly, yet detachably attached. This case member has an open upper enlarged and flanged end and a closed lower end, said upper end being attached fixedly, yet detachably, to the said depending projection 3a at a tongue-and-groove connection 15.

Within the interior space of the case member 6, a reed switch 7 is arranged which comprises a pair of switching contacts 7a and 7b, while the upper open end of the case member is sealingly closed by means of a lead-in insulator plug 6a through which lead-in conductors 11a and 11b electrically and mechanically are connected with said contacts 7a and 7b, respectively, so as to establish an electric circuit including these contacts and to fixedly position the reed switch 7 as a whole.

A ring float 9 carrying at its inner periphery a permanent ring magnet 8 and freely enclosing the said case member 6 is floating on the free liquid surface of said braking liquid mass 5. The reed switch 7 and the permanent ring magnet 8 are so designed and arranged that when the quantity of liquid 5 is of the predetermined value, the switch 7 is magnetically closed from its normally open position and in addition it is kept at its closed position even when the liquid quantity reduces from the predetermined optimum value and by virtue of the magnetic force of the permanent magnet 8. For this purpose, the case member 6 is provided with a stop member 10 at a proper level for preventing excess lowering movement of the float 9. The stop member 10 may be provided, if necessary, on the inside wall surface of the strainer vessel 14 having a straining material at 14' and fixedly attached at its upper end portion to the inside wall of the reservoir vessel 2.

The lead-in conductors 11a and 11b extend and complete a electric circuit including a current source 12 and an alarm lamp 13 series-connected therewith, and further the reed switch contacts 7a and 7b as referred to hereinbefore. Thus, when the reed switch 7 is closed, the lamp 13 ignites.

The cap member 3 is formed at its center top with an inlet opening 16 through which oil can be supplemented when necessary. The thus introduced oil will flow down through a passage opening 17 formed between the depending projection 3a and the upper end portion of the case member 6, and then it flows along the upper curved surface of a guide ring projection 18 made integral with the case member 6. In this way, the supplemented oil can be introduced into the interior space of the strainer vessel 14 which communicates with the outer ring space of the reservoir vessel 2 through the strainer element 14' adapted for preventing foreign matters included in the supplemented oil from reaching the hydraulic braking system, not shown, which includes the master cylinder 1 as commonly known.

Numeral 19 represents a dust-preventing cover which is detachably attached to the cap member 3 for protecting the inlet opening 16. When oil is to be supplied, the cover 19 must be removed and when the oil-replenishing job has been finished, the cover is reset in position.

It will be therefore well understood from the foregoing description that when the reservoir vessel 2 is filled with oil more than the predetermined minimum value, the reed switch 7 is opened so that current does not flow through the lamp 13 which is thus extinguished.

On the contrary, if oil quantity is reduced from the predetermined value and by the lowering movement of the float 9, permanent magnet 8 approaches towards the switch 7, thereby the latter being switched on, so as to ignite the lamp 13.

If the oil should be reduced excessively from the predetermined liquid level, an excessive lowering motion of the float 9 where the magnetic fluxes emanating from the permanent magnet became too much weak to keep the reed switch at its closed position is positively prevented from occurrence, by the engagement of the float with the stop member. In this way, and even under excessive reduction of the oil level, the switch 7 will maintain its closed state and the lamp 13 continues to ignite for alarming.

Since the case member suspended from the cap member and has an elastic nature, and thus in an elastic manner, the contained lead switch is prevented from outside shock arriving from the vehicle chassis side. Otherwise, the normally open switch elements of the reed switch may be accidentarily closed by severe outside mechanical shocks so as to ignite erronously the alarm lamp. Under extreme and occasional conditions, the switch elements may be removed from each other far from the prescribed distance, when subjected to severe mechanical shocks. In this case, even when the liquid level should be lowered from the prescribed one, the reed switch can not be closed by the magnetic force. According to this invention, however, such defects may be prevented in an effective way.

The aforementioned alarm lamp may be replaced, if necessary, by an audio alarm means such as a buzzer.

If a large amount of oil should be supplemented, the cap member, the case member and the float can be removed from the reservoir vessel, and then the oil can be introduced into the interior of the strainer vessel. Normally, the passage 17 and opening 16 may serve as air vent which is effective to compensate with the liquid level fluctuation which occurs during the service of the automotive braking system.

The embodiments of the invention in which an exclusive property or privilege is claimed are as follows:

1. A liquid level reduction alarm device for a braking liquid reservoir vessel kept in liquid communication with a brake master cylinder, said reservoir vessel being closed at its upper open end by an elastic cap member from which a case member is suspended to extend into the interior of the reservoir, said case member receiving a magnetically operated reed switch electrically connected through said cap member to an alarm circuit.

2. The liquid level reduction alarm device of claim 1, wherein a ring float carrying a permanent magnet is arranged slidably along the case member, the position of the float depending upon the liquid level of oil contained in the reservoir vessel.

3. The liquid level reduction alarm device of claim 2, wherein a stop means is provided on said case member for engagement with said ring float to prevent excess lowering movement of the float.

4. The liquid level reduction alarm device of claim 3, wherein said cap member is formed with an opening to allow communication of the chamber defined by said reservoir vessel and said cap member with the exterior of said chamber.

5. The liquid level reduction alarm device of claim 4, further including a cover member detachably mounted on an outer surface of said cap member for covering said opening.

* * * * *

UNITED STATES PATENT AND TRADEMARK OFFICE
CERTIFICATE OF CORRECTION

PATENT NO. : 3,947,813
DATED : March 30, 1976
INVENTOR(S) : Hiroshi Uemura, et al It is certified that error appears in the above-identified patent and that said Letters Patent are hereby corrected as shown below:

[73] Assignment:
Aisin Seiki Kabushiki Kaisha and Toyota Jidosha Kogyo Kabushiki Kaisha of Kariya City, JAPAN Signed and Sealed this Thirty-first Day of August 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,947,813     Dated  March 30, 1976

Inventor(s)  Hiroshi Uemura, et al

It is certified that error appears in the above-identified patent and that said Letters Patent are hereby corrected as shown below:

[73] Assignment should read:

Aisin Seiki Kabushiki Kaisha of Kariya City, JAPAN and Toyota Jidosha Kogyo Kabushiki Kaisha of Toyota City, JAPAN This certificate supersedes Certificate of Correction issued August 31, 1976.

Signed and Sealed this

Twenty-second Day of February 1977

[SEAL]

Attest:

RUTH C. MASON
*Attesting Officer*

C. MARSHALL DANN
*Commissioner of Patents and Trademarks*